United States Patent
Feldman et al.

(10) Patent No.: US 10,959,808 B2
(45) Date of Patent: Mar. 30, 2021

(54) UNITARY CORDLESS DENTAL DRIVE APPARATUS

(71) Applicants: Michael Feldman, Toms River, NJ (US); Zachary D. Blume, Orem, UT (US)

(72) Inventors: Michael Feldman, Toms River, NJ (US); Zachary D. Blume, Orem, UT (US)

(73) Assignee: Michael Feldman, Toms River, NJ (US)

( * ) Notice: Subject to any disclaimer, the term of this patent is extended or adjusted under 35 U.S.C. 154(b) by 0 days.

(21) Appl. No.: 15/749,025

(22) PCT Filed: Oct. 13, 2017

(86) PCT No.: PCT/US2017/056489
§ 371 (c)(1),
(2) Date: Jan. 30, 2018

(87) PCT Pub. No.: WO2018/125365
PCT Pub. Date: Jul. 5, 2018

(65) Prior Publication Data
US 2020/0253688 A1    Aug. 13, 2020

Related U.S. Application Data

(63) Continuation-in-part of application No. 15/393,492, filed on Dec. 29, 2016, now Pat. No. 10,285,776.
(Continued)

(51) Int. Cl.
*A61C 1/00*     (2006.01)
*A61C 17/22*    (2006.01)
(Continued)

(52) U.S. Cl.
CPC ............ *A61C 1/0053* (2013.01); *A61C 1/003* (2013.01); *A61C 1/0023* (2013.01); *A61C 1/06* (2013.01);
(Continued)

(58) Field of Classification Search
CPC ..... A61C 1/0023; A61C 1/0053; A61C 1/003; A61C 1/005; G05G 1/30
See application file for complete search history.

(56) References Cited

U.S. PATENT DOCUMENTS 3,210,847 A    10/1965 Albert
3,244,846 A    4/1966 Hermann
(Continued)

FOREIGN PATENT DOCUMENTS

WO    WO 84/02263    6/1984

OTHER PUBLICATIONS

Practice Tips 36: Handpiece Couplers—the ABC's of ISO. American Dental Accessories, Jul. 28, 2011 from www.amerdental.com/blog/tech tips-36/.

*Primary Examiner* — Ralph A Lewis
(74) *Attorney, Agent, or Firm* — Frost Brown Todd LLC

(57) ABSTRACT

The invention provides a unitary cordless dental drive apparatus in a first embodiment having a handpiece with a cantilever arm 18 extending outward and positioned to allow a dental nose cone 26 to be connected. An activating switch 20 is located at the free end of the cantilever arm 18 in a position that is convenient for manipulation by a user. In a second embodiment, a contactor 22 is mounted below the cantilever arm 18' to contact the nose cone 26' when pressed. In a third embodiment, a standard dental office foot pedal 90 is connected to a wireless transmitter 80 for sending a signal to a receiver 92 located within the handpiece 70 for activating the handpiece 70.

20 Claims, 6 Drawing Sheets

Related U.S. Application Data

(60) Provisional application No. 62/298,493, filed on Feb. 23, 2016.

(51) Int. Cl.
  *A61C 17/26*   (2006.01)
  *A61C 1/18*   (2006.01)
  *A61C 17/00*   (2006.01)
  *G05G 1/30*   (2008.04)
  *A61C 1/06*   (2006.01)

(52) U.S. Cl.
  CPC ............ *A61C 1/186* (2013.01); *A61C 17/005* (2013.01); *A61C 17/221* (2013.01); *A61C 17/224* (2013.01); *A61C 17/26* (2013.01); *G05G 1/30* (2013.01); *A61C 2204/002* (2013.01); *A61C 2204/005* (2013.01)

(56) References Cited

U.S. PATENT DOCUMENTS

| | | | |
|---|---|---|---|
| 3,700,836 | A | 10/1972 | Rackson |
| 3,827,149 | A | 8/1974 | Brennan |
| 3,829,974 | A | 8/1974 | McShirley |
| 3,855,704 | A | 12/1974 | Booth |
| 3,878,348 | A | 4/1975 | German |
| 3,886,660 | A | 6/1975 | Thornton, Jr. et al. |
| 3,924,335 | A | 12/1975 | Balamuth et al. |
| 3,983,344 | A | 9/1976 | Straihammer |
| 4,183,140 | A | 1/1980 | Rieselman |
| 4,359,317 | A | 11/1982 | Strohmaier et al. |
| 4,730,880 | A | 3/1988 | Schmidt et al. |
| 4,826,431 | A | 5/1989 | Fujimura et al. |
| 4,884,968 | A | 12/1989 | Stien |
| 5,039,304 | A | 8/1991 | Heil |
| 5,453,006 | A | 9/1995 | Nakamura |
| 5,639,236 | A | 6/1997 | Martin |
| 5,851,112 | A | 12/1998 | Daikuzono et al. |
| 5,902,105 | A | 5/1999 | Uejima et al. |
| 6,014,079 | A | 1/2000 | Huang |
| 6,014,679 | A | 1/2000 | Tomioka et al. |
| 6,428,517 | B1 | 8/2002 | Hochman et al. |
| 6,722,881 | B1 | 4/2004 | Altendorf et al. |
| 6,799,968 | B2 | 10/2004 | Aumuller et al. |
| 6,824,453 | B1 | 11/2004 | Andersson |
| 7,101,182 | B2 | 9/2006 | Garrison et al. |
| 7,238,021 | B1 | 7/2007 | Johnson |
| 7,428,439 | B1 | 9/2008 | Reynolds et al. |
| D595,851 | S | 7/2009 | Karten et al. |
| D604,412 | S | 11/2009 | Kobayashi |
| 7,659,833 | B2 * | 2/2010 | Warner ............... A61C 17/20 340/12.5 |
| 7,675,430 | B2 * | 3/2010 | Warner ............... A61C 1/0023 340/12.5 |
| 7,857,621 | B2 | 12/2010 | Teufelberger et al. |
| 8,159,370 | B2 | 4/2012 | Shields et al. |
| 8,274,376 | B2 | 9/2012 | Shields et al. |
| 8,435,034 | B2 | 5/2013 | Gersh et al. |
| 8,459,992 | B2 | 6/2013 | Carron et al. |
| D687,552 | S | 8/2013 | Kile et al. |
| 8,692,657 | B2 | 4/2014 | Villette et al. |
| 8,723,668 | B1 * | 5/2014 | Strohallen ............ A61G 15/02 340/539.12 |
| 8,725,096 | B2 | 5/2014 | Lint et al. |
| 8,937,561 | B2 | 1/2015 | Shields et al. |
| 9,144,471 | B2 | 9/2015 | Carron et al. |
| 9,265,518 | B2 | 2/2016 | Ware et al. |
| 9,585,549 | B1 | 3/2017 | Elazar et al. |
| 9,869,606 | B2 | 1/2018 | Earthman et al. |
| D810,938 | S | 2/2018 | Feldman |
| 10,226,310 | B2 | 3/2019 | Feldman |
| 10,285,776 | B1 * | 5/2019 | Feldman ............... G05G 1/30 |
| 10,492,893 | B2 | 12/2019 | van der Poel et al. |
| 2005/0130097 | A1 * | 6/2005 | Warner ............... A61C 1/0023 433/77 |
| 2006/0014119 | A1 | 1/2006 | Bouneff |
| 2007/0166662 | A1 | 7/2007 | Lint et al. |
| 2007/0254261 | A1 * | 11/2007 | Rosenblood ......... A61C 1/0023 433/98 |
| 2008/0017787 | A1 * | 1/2008 | Okawa ................ A61B 1/0623 250/226 |
| 2008/0140158 | A1 | 6/2008 | Hamel et al. |
| 2008/0166685 | A1 | 7/2008 | Rosenblood et al. |
| 2008/0318184 | A1 | 12/2008 | Zargari et al. |
| 2009/0081610 | A1 | 3/2009 | Hayman et al. |
| 2011/0275025 | A1 | 11/2011 | Lint et al. |
| 2012/0005296 | A1 * | 1/2012 | Lint .................... A61C 1/0023 709/208 |
| 2012/0301840 | A1 | 11/2012 | Poli |
| 2015/0201918 | A1 | 7/2015 | Kumar et al. |

* cited by examiner

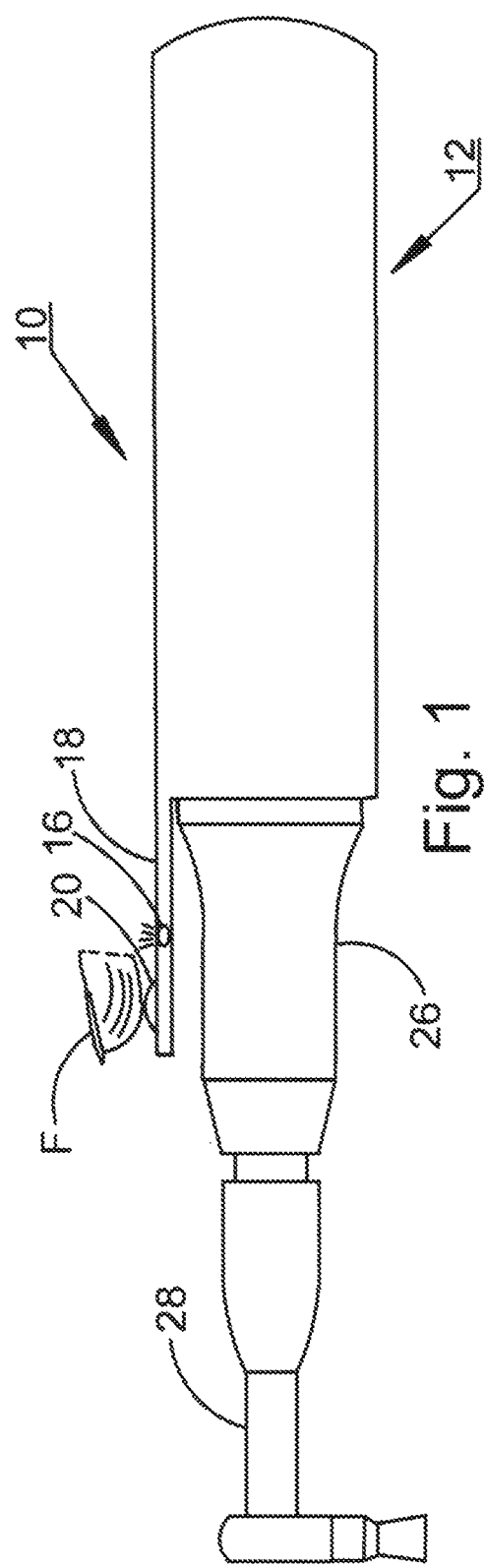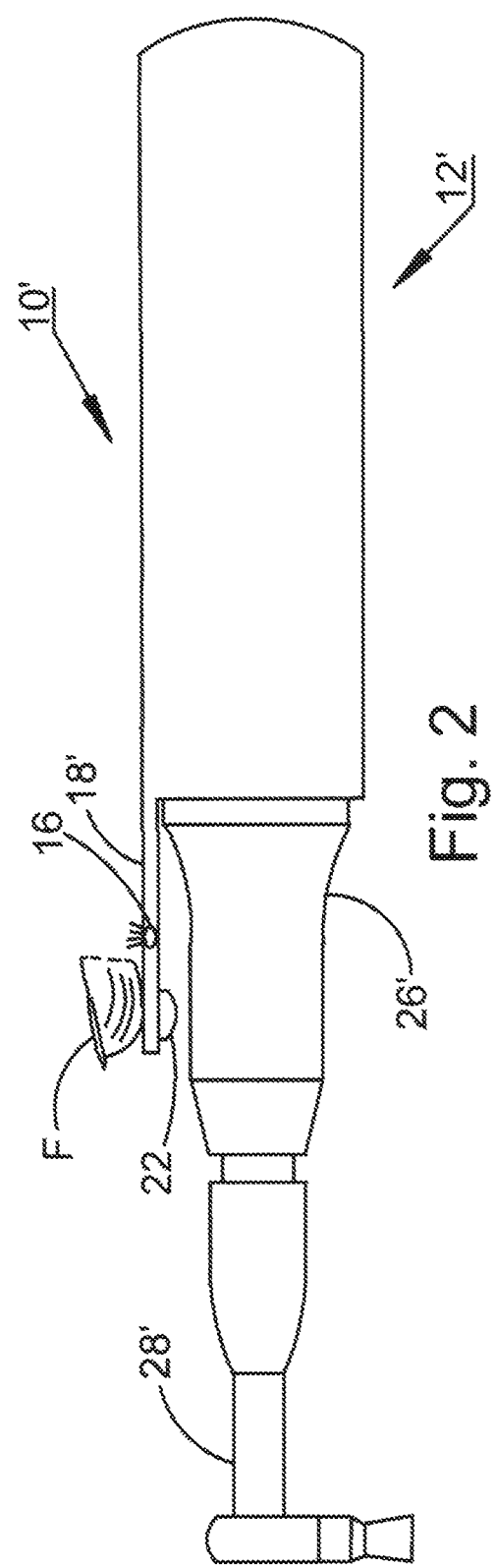

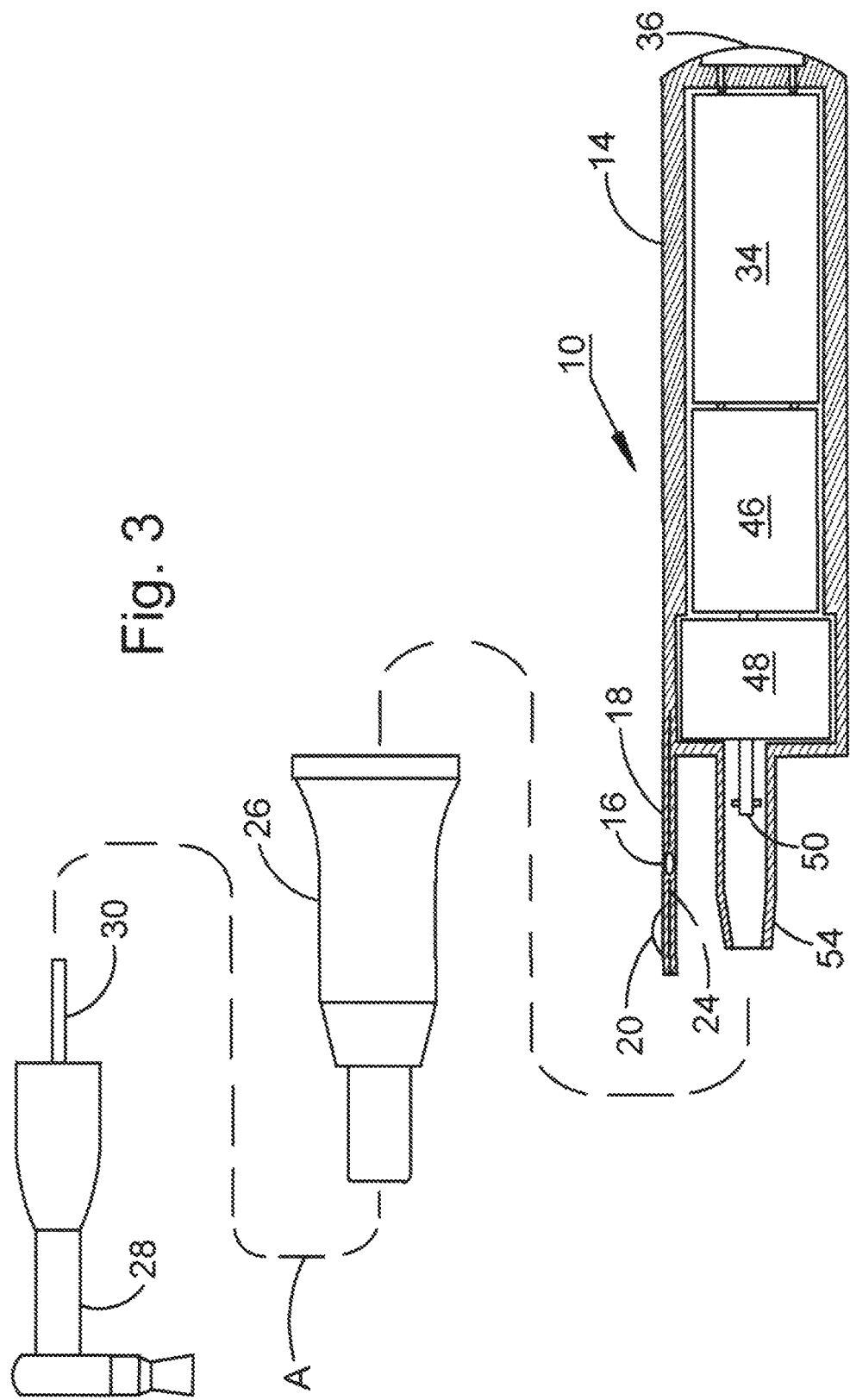

UNITARY CORDLESS DENTAL DRIVE APPARATUS

This application is a national stage entry of International Patent Application PCT/US2017/056489, entitled "Unitary Cordless Dental Drive Apparatus" filed Oct. 13, 2017, published WO 2018/125365 on Jul. 5, 2018, which is a continuation in part of U.S. patent application Ser. No. 15/393,492, entitled "Unitary Cordless Dental Drive Apparatus," filed Dec. 29, 2016, issued as U.S. Pat. No. 10,285,776 on May 14, 2019, the disclosures of which are hereby incorporated by reference herein in their entirety.

FIELD OF THE INVENTION

The present invention relates to the field of dental equipment, and more particularly to a cordless dental drive apparatus incorporating a rechargeable power source and a cantilevered activating switch in a first embodiment, and a foot operated air control with a cordless transmitter/receiver system in a second embodiment.

BACKGROUND OF THE INVENTION

The practice of dentistry utilizes a plurality of power driven tools for remediating decayed dental areas and for cleaning tooth surfaces. Traditional dental equipment is driven by an external drive device to cause the tool to rotate. The external drive device may be either a motor with an articulable power transmission, e.g. a pivoting pulley and belt system, a supply of compressed air that is directed to the dental handpiece through tubing, or an electric motor in the dental handpiece that is powered by an electrical cord. These three drive systems provide the needed power, but the connected hoses, pulleys and belts, or electrical cords cause them to be fairly cumbersome and fatiguing to use, particularly for extended periods of time, as is typically the case in professional cleaning of a patient's teeth.

Recent developments in dental equipment have provided certain advances in apparatus for the rotating of dental tools. These drive devices are substantially self-contained and free of a cumbersome external drive. These devices have a battery and a motor within the handpiece, thereby eliminating the cumbersome power transmission apparatus. The resultant cordless handpiece is more easily manipulated and, especially in use by a dentist or dental hygienist for long periods during dental cleanings, less likely to cause fatigue. However, the known devices are limited in the manner for controlling the power, i.e. switched on and off. The known cordless handpieces are controlled by a switch that is located in an inconvenient position. The switch on known devices is located either toward the rear of the handpiece or near the front of the handpiece. The dental hygienist must hold the handpiece with one hand and actuate the switch with the other hand, typically done before the dental tool is in the patient's mouth. When used for cleaning the patient's teeth, this results in much of the cleansing paste being sprayed outside of the mouth, which tends to be uncomfortable for the patient, wasteful, and messy. In addition, tooth cleaning is typically done with a series of short bursts of drive power, making the remotely located switch even more inconvenient. The present invention provides a unitary cordless dental drive apparatus that is an improvement on, and overcomes the drawbacks of, the known prior devices.

A further development in dental equipment is embodied in U.S. Published Patent Application No. 2007/0254261 to Rosenblood et al. for a Wireless Control For Dental Equipment. The invention described in the Rosenblood patent application utilizes an electronic foot pedal that transmits a signal to an electronic receiver that provides a modulated current to the handpiece to control rotational speed. While the Rosenblood invention provides a type of control for a dental handpiece that avoids the need for connective pulleys or hoses, this system requires the dental office to acquire a new foot pedal to replace the standard air controlling foot pedal that exists in virtually every dental office. The present invention provides a unitary cordless dental drive apparatus that is an improvement on, and overcomes the drawbacks of, the known prior devices.

SUMMARY OF THE INVENTION

The invention disclosed below provides a unitary cordless dental drive apparatus adapted for flexible, comfortable, and durable dental office service. The novel handpiece has a battery power source, a drive motor and a gear train enclosed in a housing. The housing is split to enable opening for factory servicing. A European type (E-type) output shaft extends from the gear train, allowing all universal dental nose cones and tools to be connected. The battery power is connected to the motor through a switch which, in the first preferred embodiment, is supported at the free end of a cantilever arm and located in a position to be convenient for the user. The invention includes a microprocessor, or programmable logic control, enabling a variety of functions for the switch, e.g. on/off, momentary contact, timed cycle on with automatic off, varying operating speed by steps each time the switch is pressed. The cantilever arm may be internally reinforced by a resilient wire. In a second embodiment of the invention, the cantilever arm is incorporated with an electrically conductive contactor, the arm adapted for flexing under pressure to cause the contactor to touch a conductive part of the dental nose cone to activate the drive motor.

In a third embodiment of the invention, a dental hose connector is attached to a pressurized air hose, the air hose being attached to a standard dental foot pedal controller having a supply of pressurized air connected. The dental technician or dentist actuates the foot pedal to cause a flow of pressurized air to travel through the hose to the hose connector to an enclosed air chamber having a pressure sensor. The flow of pressurized air enters the chamber through an inlet hole in the hose connector and exits the chamber through an outlet hole in the hose connector. The pressure sensor generates a first electrical signal proportional to the sensed air pressure within the chamber and conveys the electrical signal to a transmitter that sends a wireless signal, e.g. a radio frequency signal. A receiver within the handpiece converts the wireless signal to a second electrical signal that is proportional to the air pressure in the chamber. The second electrical signal causes the drive motor to operate at a speed related to the degree of movement of the foot pedal actuated by the dental technician or dentist. In all embodiments of the invention, the dental handpiece is fully operable with no directly connected air hoses or drive belts and pulleys.

BRIEF DESCRIPTION OF THE DRAWINGS

The present invention is best understood in conjunction with the accompanying drawing figures in which like elements are identified by similar reference numerals and wherein:

FIG. 1 is a side elevation view of the unitary cordless dental drive apparatus in a first embodiment.

FIG. 2 is a side elevation view of the unitary cordless dental drive apparatus in a second embodiment.

FIG. 3 is an exploded side elevation view of the embodiment of FIG. 1 with the dental handpiece illustrated in cross section.

DETAILED DESCRIPTION OF THE PREFERRED EMBODIMENTS

Figure 4B:
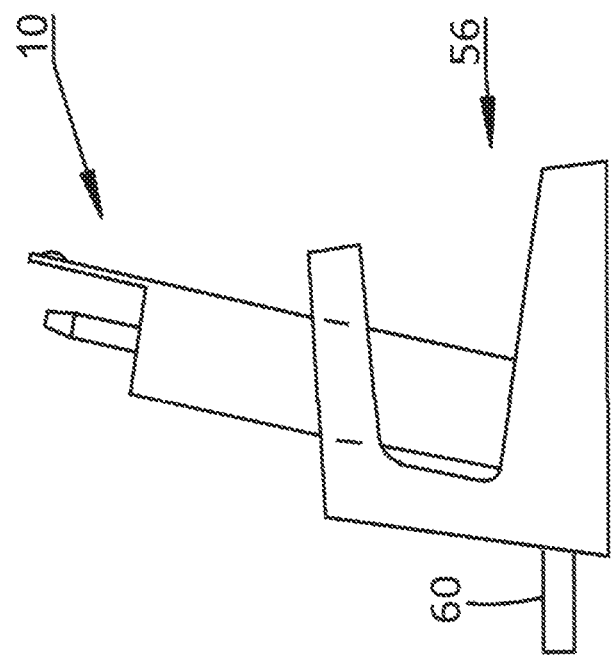
FIGS. 4A and 4B are side elevation views of the cordless drive apparatus being placed into a charging base and set into the charging base.

Referring to FIG. 1, a first embodiment of the present invention is shown in side elevation view. The unitary cordless dental drive apparatus provides a handpiece 10 with a power unit 12, e.g. a rechargeable battery, a power converter unit including a motor and a gear train. The internal components of handpiece 10 are preferably encased in a sealed housing for protection against moisture and contamination. A conventional dental nose cone 26 is removably mounted to handpiece 10. Nose cone 26 receives power from power unit 12 to rotatably drive a prophylaxis angle device 28. It will be understood that the present invention may be beneficially utilized with non-disposable prophylaxis angle devices as well as disposable ones. Depending on the purpose for which the present invention is to be used, another dental attachment may be employed, e.g. an abrasive tip. A switch 20 is mounted to the free end of an arm 18, arm 18 being fixedly assembled in cantilever fashion to the housing portion of handpiece 10 to position switch 20 conveniently for being contacted by a user's fingertip F when in use. Arm 18 is configured as a cantilever structure to suspend switch 20 and maintain a space between arm 18 and nose cone 26, permitting nose cone 26 to be readily mounted and removed. Switch 20 is preferably in the form of a micro-miniature membrane switch that is connected to a microprocessor (not shown) within handpiece 10, the microprocessor including a transistor relay activated by switch 20. When activated, the transistor relay connects the enclosed battery power source to the motor, causing the cleansing paste cup of prophylaxis angle device 28 to rotate. Switch 20 also activates an indicator 16, e.g. a miniature LED light source. Indicator 16 may be programmed to remain continuously on, flash on in a specified pattern, as well as display different colors for different conditions, e.g. normal operation, excessive power being drawn from the power source, or the power source in need of recharging, etc. As will be understood by those skilled in the trade, the location of switch 20 at the free end of cantilever arm 18 allows the dental hygienist to place the tip of prophylaxis angle device 28 inside the mouth of the dental patient before activating power unit 12, thereby avoiding spraying and waste of the cleansing paste.

Referring now to FIG. 2, a second embodiment of the present invention is shown in side elevation view. Handpiece 10', power unit 12', nose cone 26', and prophylaxis angle device 28', are substantially similar to comparable components in the first embodiment shown in FIG. 1. A cantilever arm 18' extends outwardly from handpiece 10'. The second embodiment of FIG. 2 differs from the first embodiment of FIG. 1 in that the electrical circuit is completed by a contactor 22 mounted to the lower surface of arm 18'. As nose cone 26' is typically metallic, when the user presses arm 18' to flex downward with fingertip F to cause contactor 22 to touch nose cone 26', a circuit is closed between the battery and the motor. As will be described below, cantilever arm 18' of this second embodiment is designed to be flexed by finger pressure. This second embodiment of the invention also incorporates the primary objective of locating contactor 22 for convenient use by the dental hygienist during tooth cleaning or other procedures.

Referring now to FIG. 3, the unitary cordless dental drive apparatus of the first embodiment is shown with the components arrayed in exploded side elevation view. The components are in position to be assembled along axis A, shown as a dashed line. Handpiece 10 is shown in cross section for clarity. Handpiece 10 has a unitary housing 14 with cantilever arm 18 molded integrally therewith. Arm 18 may, optionally, be reinforced to withstand flexural stress with the incorporation of one or more reinforcing rods 24, e.g. piano wire. Indicator 16 is also molded into arm 18 and incorporated in the electrical circuit of handpiece 10. Electrical power is provided by a battery 34 to a motor 46 which is mechanically coupled to a gear train 48 for driving an output shaft 50 at a selected rotary speed and torque. Battery 34 may be either a rechargeable or non-rechargeable replaceable type. Gear train 48 may be configured to provide continuous rotary action or reciprocating rotary action according to the intent of the manufacturer. Output shaft 50 with coupler 54 and nose cone 26 are in the configuration known in the trade as an E-type coupling to connect securely to one another. In the preferred embodiment of the invention, coupler 54 is sized to fit slidingly into nose cone 26, allowing the user to swivel nose cone 26 and prophylaxis angle device 28 while keeping handpiece 10 upright with switch 20 at the fingertip position. Prophylaxis angle device 28 is mounted to nose cone 26 and driven through nose cone 26 by shaft 50. Battery 34 is preferably a rechargeable battery with an operating rating of 650 milliampere hours at 3.7 volts. Handpiece 10 includes a charging connector 36 that is configured to engage a charging base device when battery 34 is in need of being recharged.

Referring further to FIG. 3, arm 18 extends outwardly from handpiece 10 in cantilever fashion to position switch 20 suspended at a convenient placement for being manipulated by finger pressure of the user. In the preferred embodiments of the invention, housing 14 of handpiece 10 is formed of a lightweight material, e.g. high density polyethylene or polycarbonate resin. Whereas the plastic encased handpiece is not receptive to repeated autoclaving, and whereas only nose cone 26 and prophylaxis angle device 28 contact the mouth of the patient, handpiece 10 may be adequately protected by applying a thin sleeve over the handpiece prior to the dental procedure and/or cleaned by use of a disinfecting solution. The dental tool, specifically the disposable prophylaxis angle device 28, is discarded after every patient. In the first embodiment of the invention, metallic reinforcing bars 24, shown within cantilever arm 18, may optionally be included. Reinforcing bars 24, if used, are sized to maintain the structural rigidity of arm 18 against finger pressure on switch 20. Reinforcing bars 24 also serve to conduct electrical current from power source battery 34 through switch 20 to motor 46. It is understood in the second embodiment of the invention (see FIG. 2) that reinforcing rods 24 shown in FIG. 3 in arm 18 are sized to be resilient and spring back to the original shape. Cantilever arm 18 allows nose cone 26 or other dental attachments to be assembled and removed from coupler 54 while locating switch 20 for comfortable use by the dental hygienist.

The unitary cordless dental drive apparatus of the invention is for use by dentists and dental hygienists, some of whom may apply excessive force of the cleaning cup of the prophylaxis angle device against the patient's teeth. This excessive pressure places a strain on the motor, potentially causing motor damage. Excessive pressure against the teeth may also cause damage to tooth enamel. To avoid enamel damage and motor damage, an additional feature of the invention is to incorporate an overload restriction control in the microprocessor that is built into the handpiece. When an excessive current, e.g. 1.0 amp, is drawn, electrical current is automatically deactivated and a signal is energized such as indicator light 16 or a buzzer. By deactivating the electrical current and stopping the motor, the dentist or dental hygienist will soon learn the appropriate degree of pressure to apply.

Figure 4A:
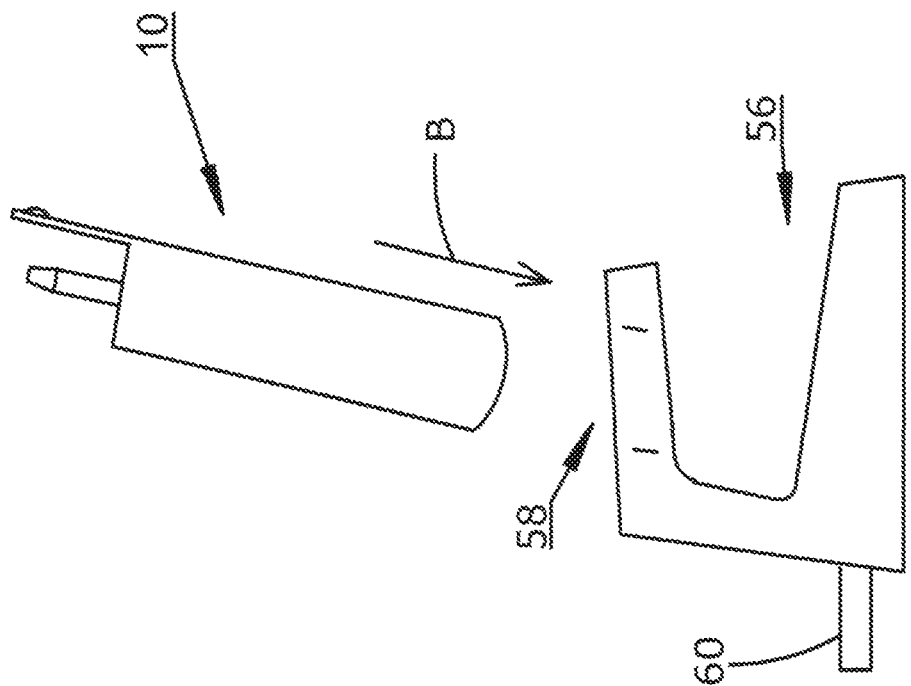

Referring now to FIG. 4A, a side elevation view is shown of handpiece 10 about to be inserted into a recharge unit 56. Recharge unit 56 receives electrical power through power cord 60. Recharge unit 56 is formed with an aperture 58 for receiving handpiece 10 slidingly therethrough.

Referring now to FIG. 4B, handpiece 10 is shown as being inserted into recharge unit 56 for a prescribed period to recharge the battery within handpiece 10. While handpiece 10 is illustrated in recharge unit 56 without the dental nose cone or dental tool, recharging may be done with or without these components.

Figure 5:
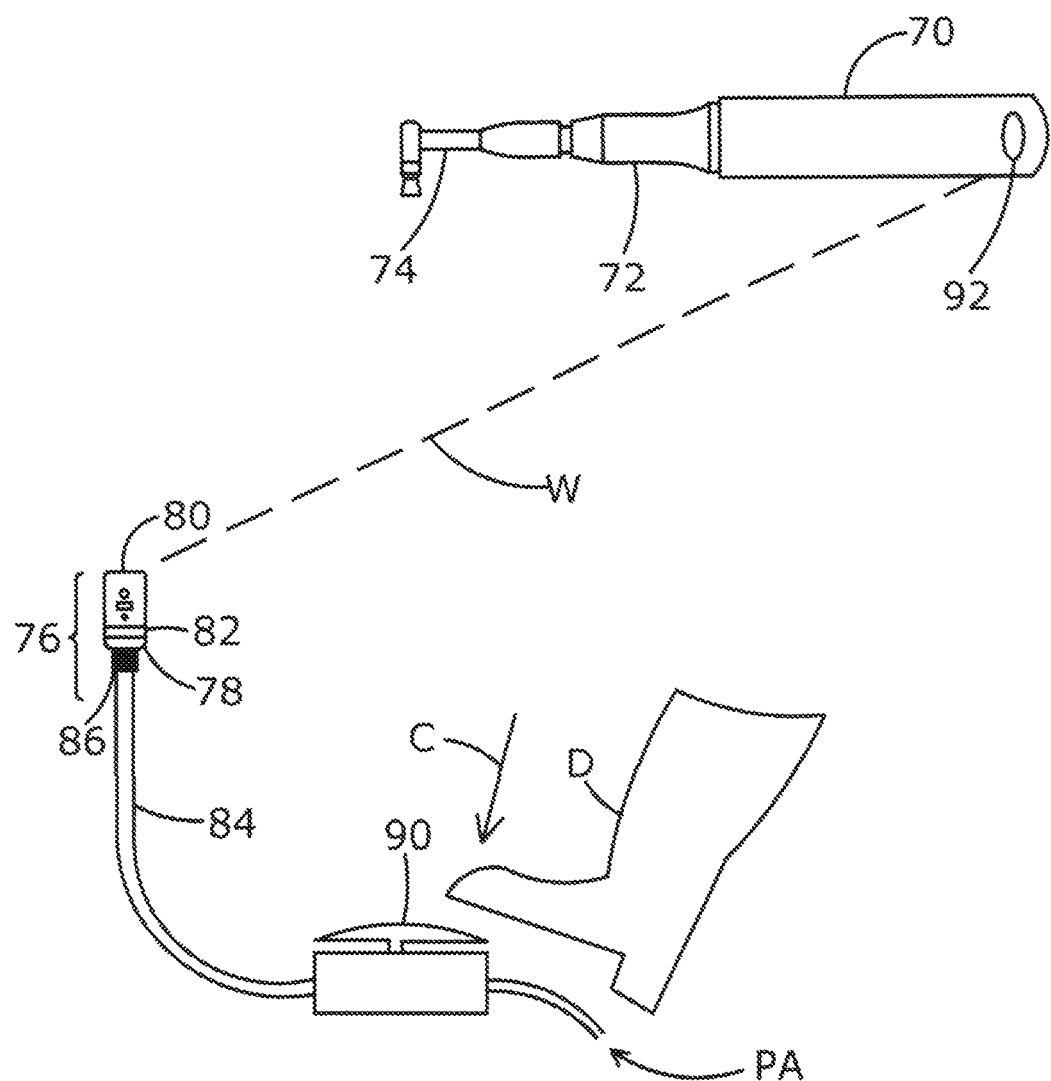
FIG. 5 is a schematic view of a third embodiment of the invention in which power is controlled by an existing dental office foot pedal and sent wirelessly from a transmitter to a receiver in the dental handpiece.

Referring now to FIG. 5, a third embodiment of the present invention is shown in schematic side elevation view. In this embodiment, a standard dental office foot pedal 90 is employed to control pressurized air to activate and deactivate the motor within handpiece 70. Handpiece 70 has a nosecone 72 and a dental tool 74 connected thereto. It is noted that handpiece 70 has no physically connected mechanical, electrical, or pneumatic power supply. As will be described below, handpiece 70 has an internal power supply as well as a drive motor and an activating switch device with operating indicator. The cantilever arm of the embodiments described above is not shown in this embodiment, although a cantilever arm without a switch may be added. In the typical dental office application of the invention, an existing foot pedal 90 is connected to receive a supply of pressurized air PA.

Referring further to FIG. 5, handpiece 70 receives a wireless signal W from a conversion unit 76 consisting of an air supply connector 78, an air chamber 82 and wireless transmitter 80. A hose 84 is mounted to connector 78 with a standard nut (not numbered), hose 84 being in pneumatic communication with standard dental foot pedal 90. Foot pedal 90 is illustrated as the type having a base block and a rounded presser switch on top, but other types of foot pedal will be equally satisfactory in the application of the present invention. The foot D of a dentist or dental technician is in position to press the rounded presser switch of foot pedal 90.

Whereas foot pedal 90 is of the type that has been standard equipment in dental offices throughout the world for years, the user connects foot pedal 90 to transmitter 80 of the present invention to obtain the benefit of relieving handpiece 70 of the need for and weight of connective wires or hoses to operate handpiece 70. The degree of pressure and flow of air being conducted through foot pedal 90 to transmitter 80 varies according to the action of the dentist or dental hygienist, represented by boot D, in the direction indicated by arrow C. Transmitter 80 may be any form of wireless transmitter, and is capable of transmitting a wireless signal to a receiver within the dental handpiece.

Figure 6:
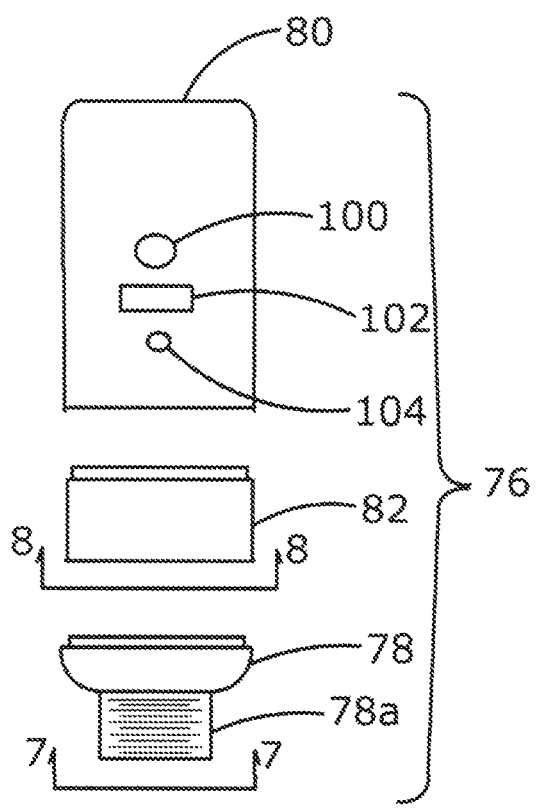
FIG. 6 is an exploded side elevation view of the conversion unit 76 of FIG. 5.

Referring now to FIG. 6, the conversion unit 76, consisting of connector 78 with threaded nipple 78a, air chamber 82, transmitter 80, and a charging coil (not seen). A pressurized air hose 84 with connecting nut 86 is positioned for mounting to threaded nipple 78a of connector 78. Connector 78 is substantially similar to the connector typically used with a currently known dental handpiece and to which a pressurized air hose is connected. Connector 78 transmits pressurized air to air chamber 82. Air chamber 82 receives the pressurized air from connector 78 and releases exhaust air back through connector 78. A pressure sensor (not seen) is mounted within air chamber 82, the pressure sensor converting air pressure to an electrical signal that is connected to transmitter 80.

Referring further to FIG. 6, transmitter 80 has a switch 100 that connects a battery 102 to activate the electrical circuit within. It is noted that the utilization of dental equipment is virtually continuous throughout the work day, therefore switch 100 turns transmitter 80 on and an internal timer turns transmitter 80 off after a selected number of hours of operation. Adjacent to switch 100 is rechargeable battery 102 that provides power to operate transmitter 80. An indicator 104, for example an LED light source, is mounted to transmitter 80, indicator 104 preferably being programmed to be illuminated for an initial period and then to flash at a selected interval thereafter.

Figure 7:
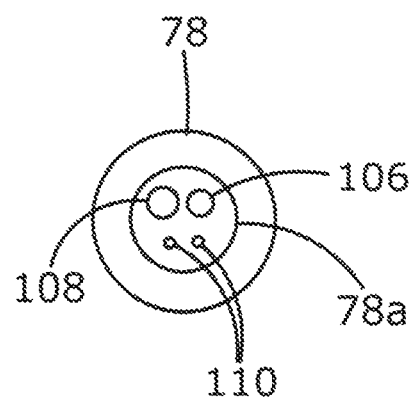
FIG. 7 is a bottom plan view of a standard dental office air connector seen in the direction of line 7-7 of FIG. 6.

Referring now to FIG. 7, connector 78 is seen in bottom plan view in the direction indicated by line 7-7 of FIG. 6, with threaded nipple 78a seen as the central portion. A series of holes 106, 108, 110 of varied sizes are formed through threaded nipple 78a and connector 78. Hose 84 and nut 86 (see FIG. 6) are formed with a matching set of openings configured to align with the holes in threaded nipple 78a. An inlet hole 106 is positioned adjacent to an outlet hole 108. In the typical style of connector 78, inlet hole 106 is preferably on the order of 10 percent smaller in diameter than outlet hole 108, e.g. inlet hole 106 may have a diameter of 4.0 mm and outlet hole 108 may have a diameter of 4.5 mm. Holes 110, which may be used in conventional dental equipment for a water line and an auxiliary air line, are not operationally functional. This four hole configuration presents a familiar pattern to assemble hose 84 (FIG. 6) in proper alignment with threaded nipple 78a.

Figure 8:
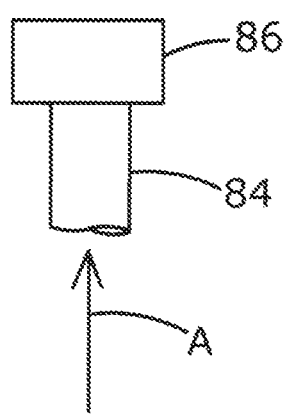
FIG. 8 is a bottom plan view of the air chamber of the invention seen in the direction of line 8-8 of FIG. 6.

Referring now to FIG. 8, air chamber 82 is seen in bottom plan view in the direction indicated by line 8-8 of FIG. 6. Air chamber 82 is a hollow enclosure with a sealed body having an air chamber inlet 112 and an air chamber outlet 114 provided through the lower wall of air chamber 82. When connector 78 (see FIG. 7) is assembled to air chamber 82, inlet 106 of connector 78 is positioned coaxially with air chamber inlet 112, and outlet 108 of connector 78 is positioned coaxially with air chamber outlet 114. As illustrated, air chamber inlet 112 may be equal in diameter to inlet 106 of connector 78. As illustrated, air chamber outlet 114 is smaller in diameter than air chamber inlet 112, thereby maintaining an air cushion within air chamber 82 for more accurate measurement of air pressure. Air chamber outlet 114 may be, e.g., 20 percent to 60 percent smaller in diameter than air chamber inlet 112, preferably on the order of 40 percent to 50 percent smaller.

Figure 9:
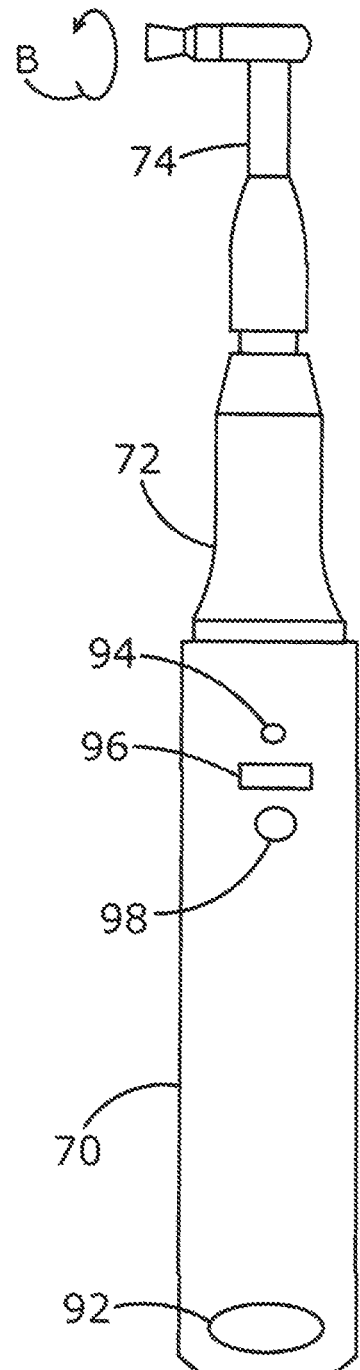
FIG. 9 is a side elevation view of the handpiece of the third embodiment of the invention with a nosecone and dental tool mounted thereto.

Referring now to FIG. 9, dental handpiece 70 of the present invention is shown in side elevation view with a conventional nose cone 72 and a typical dental tool 74 mounted thereto. As noted above, handpiece 70 includes a power source 96, e.g. a rechargeable battery, an electric motor (not seen), a wireless receiver 92, and a charging coil (not seen). Handpiece 70 has a switch 98 that energizes the circuitry within handpiece 70 to standby mode, enabling receiver 92 to receive wireless signals from transmitter 80 (see FIG. 6). An internal timer turns handpiece 70 off after a selected number of hours of operation. As described above, operating control of handpiece 70 is provided by the standard foot pedal air controller that exists in virtually all dental offices. Receiver 92 has circuitry adapted to receive a signal from transmitter 80 (see FIG. 6) and send a corresponding electrical signal to activate or deactivate the motor within handpiece 70. An indicator 94, e.g. an LED light source, is preferably programmed to be illuminated for a period of time upon activation of the motor within handpiece 70 and then flash intermittently.

Figure 10:
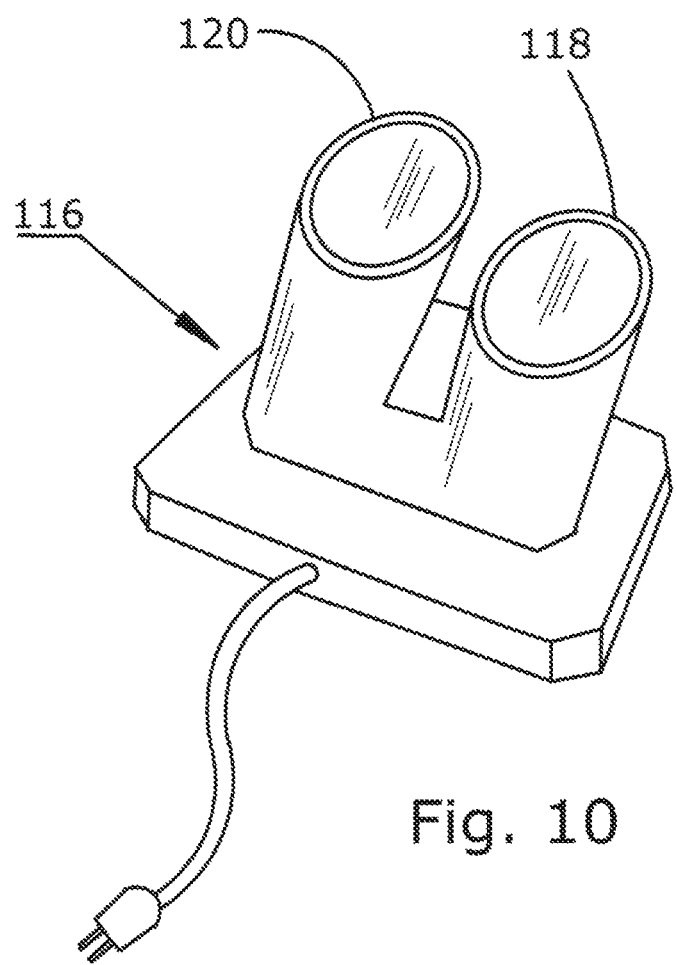
FIG. 10 is a perspective view of a dual charging unit adapted to charge the handpiece and the transmitter simultaneously.

Referring now to FIG. 10, a double recharging base 116 is provided, including a first socket 118 and a second socket 120. Sockets 118, 120 may be configured differently from one another to optimally accommodate handpiece 70 (see FIG. 5) and transmitter 80. In the illustration, socket 120 is longer than socket 118. Other differences may be formed according to the intent of the manufacturer.

While the description above discloses preferred embodiments of the present invention, it is contemplated that numerous variations and modifications of the invention are possible and are considered to be within the scope of the claims that follow.

What is claimed is:

1. A unitary cordless dental drive apparatus, comprising:
   a. a foot pedal connected to an air hose for controlling a supply of pressurized air PA;
   b. an air chamber connected for receiving pressurized air PA from the air hose through the foot pedal, the air chamber formed with an inlet and an outlet;
   c. a connector mounted between the air hose and the air chamber, the connector being formed with an inlet and an outlet, the inlet being smaller in diameter than the outlet;
   d. wherein the air chamber inlet has a diameter that is similar to the connector inlet diameter, and the air chamber outlet has a diameter that is smaller than the connector outlet diameter;
   e. a wireless transmitter mounted to the air chamber, the transmitter capable of transmitting a wireless signal W corresponding to a flow of pressurized air PA from the foot pedal; and
   f. a wireless receiver assembled within a dental handpiece, the wireless receiver activating the dental handpiece in response to receiving the transmitted wireless signal W from transmitter;
   g. whereas the dental handpiece operating speed is related to the flow of pressurized air controlled by the foot pedal.

2. The unitary cordless dental drive apparatus described in claim 1, wherein the foot pedal is a pressurized air PA supply control device.

3. The unitary cordless dental drive apparatus described in claim 2, further comprising a pressure sensor assembled within the air chamber, the pressure sensor being in electrical connection with the transmitter.

4. The unitary cordless dental drive apparatus described in claim 3, wherein the air chamber outlet diameter is smaller than the air chamber inlet diameter.

5. The unitary cordless dental drive apparatus described in claim 1, further comprising an operation indicator mounted on the wireless transmitter.

6. The unitary cordless dental drive apparatus described in claim 5, wherein the indicator mounted on the transmitter is a visible indicator.

7. The unitary cordless dental drive apparatus described in claim 6, wherein the visible indicator is programmed for illuminating intermittently.

8. The unitary cordless dental drive apparatus described in claim 1 further comprising an operating indicator mounted on the handpiece.

9. The unitary cordless dental drive apparatus described in claim 1, further comprising a power source mounted to the wireless transmitter, the power source being rechargeable.

10. The unitary cordless dental drive apparatus described in claim 9, further comprising a charger for recharging the power source mounted to the wireless transmitter.

11. The unitary cordless dental drive apparatus described in claim 1, further comprising a power source mounted to the handpiece, the power source being rechargeable.

12. The unitary cordless dental drive apparatus described in claim 11, further comprising a charger for recharging the power source mounted to the handpiece.

13. The unitary cordless dental drive apparatus described in claim 1, further comprising a switch mounted to the wireless transmitter for activating the wireless transmitter.

14. The unitary cordless dental drive apparatus described in claim 1, further comprising a switch mounted to the handpiece for activating the handpiece.

15. A unitary cordless dental drive apparatus, comprising:
   a. a foot pedal connected to an air hose for controlling a supply of pressurized air PA;
   b. an air chamber connected for receiving pressurized air PA from the air hose through the foot pedal, the air chamber formed with an outlet having a diameter that is smaller than an inlet diameter thereof;
   c. a connector mounted between the air hose and the air chamber, the connector being formed with an inlet and an outlet, the inlet being smaller in diameter than the outlet;
   d. wherein the air chamber inlet has a diameter that is similar to the connector inlet diameter, and the air chamber outlet has a diameter that is smaller than the connector outlet diameter;
   e. a wireless transmitter mounted to the air chamber, the transmitter capable of transmitting a wireless signal W corresponding to a flow of pressurized air PA from the foot pedal; and
   f. a wireless receiver assembled within a dental handpiece, the wireless receiver activating the dental handpiece in response to receiving the transmitted wireless signal W from transmitter;
   g. whereas the dental handpiece operating speed is related to the flow of pressurized air controlled by the foot pedal.

16. The unitary cordless dental drive apparatus described in claim 15, wherein the foot pedal is a pressurized air PA supply control device.

17. The unitary cordless dental drive apparatus described in claim 16, further comprising a pressure sensor assembled within the air chamber, the pressure sensor being in electrical connection with the transmitter.

18. The unitary cordless dental drive apparatus described in claim 15, further comprising an operation indicator mounted on the wireless transmitter.

19. The unitary cordless dental drive apparatus described in claim 15, further comprising a power source mounted to the handpiece, the power source being rechargeable.

20. The unitary cordless dental drive apparatus described in claim 15, further comprising a switch mounted to the wireless transmitter for activating the wireless transmitter.

\* \* \* \* \*